(12) United States Patent
Alfano et al.

(10) Patent No.: US 9,125,030 B2
(45) Date of Patent: *Sep. 1, 2015

(54) APPARATUS, AND ASSOCIATED METHOD, FOR SUPPORTING SMS MESSAGING BY WAY OF AN IP NETWORK

(75) Inventors: Nicholas Alfano, Warwickshire (GB); Andrew Allen, Mundelein, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 75 days.

This patent is subject to a terminal disclaimer.

(21) Appl. No.: 12/792,220

(22) Filed: Jun. 2, 2010

(65) Prior Publication Data

US 2010/0255864 A1 Oct. 7, 2010

Related U.S. Application Data

(63) Continuation of application No. 11/426,081, filed on Jun. 23, 2006, now Pat. No. 7,734,302.

(51) Int. Cl.
*H04W 4/00* (2009.01)
*H04W 4/14* (2009.01)
*H04L 29/06* (2006.01)
*H04W 80/10* (2009.01)

(52) U.S. Cl.
CPC .............. *H04W 4/14* (2013.01); *H04L 65/104* (2013.01); *H04L 65/1006* (2013.01); *H04W 80/10* (2013.01)

(58) Field of Classification Search
CPC .................................. H04W 4/14; H04W 4/12
USPC .......................... 455/466, 412.1, 414.1, 422.1
See application file for complete search history.

(56) References Cited

U.S. PATENT DOCUMENTS

| 6,584,323 | B1 | 6/2003 | Son |
| 6,738,636 | B2 | 5/2004 | Lielbriedis |
| 7,701,969 | B2* | 4/2010 | Carrigan et al. .............. 370/466 |

(Continued)

FOREIGN PATENT DOCUMENTS

| JP | 2002517964 | 6/2002 |
| JP | 200496484 | 3/2004 |

(Continued)

OTHER PUBLICATIONS

3GPP TS 24.341.v0.1.0 (May 2006), "3rd Generation Partnership Project; Technical Specification Group Core Network and Terminals; Support of SMS and MMS over IP Networks; Stage 3 (Release 7)", pp. 1-14, May 2006. 3GPP Organizational Partners, Valbonne, France.

(Continued)

*Primary Examiner* — Nghi H Ly
(74) *Attorney, Agent, or Firm* — Fish & Richardson P.C.

(57) ABSTRACT

Apparatus, and an associated method, for communicating short message service content to a short message service center. The address of an IP-SM-GW (Internet Protocol-Short Message-Gateway) defined in the 3GPP TS 23.204 is provided to user equipment and used to address an SIP request that contains encapsulated SMS content. The address is stored at the mobile station at a storage element, such as at a SIM card, UICC, or management object. A SIP request generator accesses the storage element and uses the address as the address of the SIP request. The SIP request also includes SMS content, in encapsulation, therein.

6 Claims, 4 Drawing Sheets

(56) References Cited

U.S. PATENT DOCUMENTS

| | | | |
|---|---|---|---|
| 7,734,302 B2* | 6/2010 | Alfano et al. | 455/466 |
| 2001/0003094 A1 | 6/2001 | Foll | |
| 2002/0131570 A1* | 9/2002 | August et al. | 379/142.01 |
| 2003/0130864 A1* | 7/2003 | Ho et al. | 705/1 |
| 2004/0097240 A1 | 5/2004 | Chen et al. | |
| 2005/0004968 A1* | 1/2005 | Mononen et al. | 709/200 |
| 2005/0078697 A1 | 4/2005 | Kobayashi | |
| 2005/0282565 A1 | 12/2005 | Shaheen | |
| 2006/0258394 A1* | 11/2006 | Dhillon et al. | 455/552.1 |
| 2006/0270404 A1* | 11/2006 | Tuohino et al. | 455/432.3 |
| 2006/0274678 A1 | 12/2006 | Holloway et al. | |
| 2007/0298817 A1 | 12/2007 | Alfano et al. | |
| 2009/0181659 A1* | 7/2009 | Stalnacke et al. | 455/416 |

FOREIGN PATENT DOCUMENTS

| | | |
|---|---|---|
| JP | 2004172907 | 6/2004 |
| JP | 2006135585 | 5/2006 |
| JP | 2008507861 | 3/2008 |
| WO | 2005122604 | 12/2005 |

OTHER PUBLICATIONS

3GPP TS 23.204 v1.1.0 (Feb. 2006), "3rd Generation Partnership Project; Technical Specification Group Services and System Aspects; Support of SMS and MMS over Generic 3GPP IP Access; Stage 2 (Release 7)", pp. 1-15, Feb. 2006. 3GPP Organizational Partners, Valbonne, France.
Open Mobile Alliance: "DM Smart Card Requirements"; Announcement Open Mobile Alliance, XX, XX, vol. V1 0-20051201-D, Dec. 1, 2005, XP003001815.
3GPP TS 31.102 v7.5,0—3rd Generation Partnership Project, Technical Specification Group Core Network and Terminals; Characteristics of the Universal Subscriber Identity Module (USIM) Application (Release 7) May 2006, 182 pages.
3GPP TS 23.204 v1.2.0—3rd Generation Partnership Project, Technical Specification Group Services and System Aspects; Support of Sms and MMS over generic 3GPP IP access; Stage 2 (Release 7) (Clean Version) May 2006, 15 pages.
3GPP TS 23.204 v1.2.0—3rd Generation Partnership Project, Technical Specification Group Services and System Aspects; Support of Sms and MMS over generic 3GPP IP access; Stage 2 (Release 7) (Marked Up Version) May 2006, 16 pages.
Japenese Patent Office, "Office Action," with English translation, issued in connection with Japanese application serial No. 2010-191567, issued Jun. 20, 2012, 7 pages.
European Patent Office, "Decision to Grant," issued in connection with application serial No. 06253272.6, issued Sep. 9, 2010, 1 page.
European Patent Office, "Office Communication," issued in connection with application serial No. 06253272.6, issued Apr. 26, 2010, 6 pages.
European Patent Office, "Office Communication," issued in connection with application serial No. 06253272.6, issued Sep. 17, 2008, 4 pages.
European Patent Office, "European Search Report," issued in connection with application serial No. 06253272.6, issued Jan. 12, 2007, 6 pages.
European Patent Office, "European Search Report," issued in connection with application serial No. 10179031.9, issued Nov. 9, 2010, 8 pages.
Open Mobile Alliance, "DM Smart Card Requirements," Draft Version 1.0, Dec. 2005, 17 pages.
3GPP TR 23.804 v1.1.0—3rd Generation Partnership Project, Technical Specification Group Services and Systems Aspects; Support SMS and MMS Over Generic 3GPP; IP Access; (Release 7) Apr. 21, 2005, 23 pages.
European Patent Office, "Office Communication," issued in connection with application serial No. 10179031.9, issued Apr. 3, 2012, 4 pages.
Japanese Patent Office, "Office Action," with English translation, issued in connection with application serial No. 2007-161673, issued Apr. 26, 2010, 4 pages.
Japanese Patent Office, "Office Action," with English translation, issued in connection with application serial No. 2007-161673, issued Dec. 7, 2009, 7 pages.
Australian Government IP Australia, "Notice of Acceptance," issued in connection with application serial No. 2007202860, issued May 18, 2009, 3 pages.
State Intellectual Property Office of P.R. China, "Second Office Action," with English translation, issued in connection with application serial No. 200710112254.2, issued Jul. 22, 2011, 8 pages.
State Intellectual Property Office of P.R. China, "First Office Action," with English translation, issued in connection with application serial No. 200710112254.2, issued Dec. 25, 2009, 12 pages.
Canadian Intellectual Property Office, "Office Action," issued in connection with application serial No. 2,592,357, issued Sep. 7, 2011, 2 pages.
Korean Intellectual Property Office, "Office Action" with English translation, issued in connection with application serial No. 10-2007-0061696, issued Mar. 30, 2010, 6 pages.
Korean Intellectual Property Office, "Office Action," with English translation, issued in connection with application serial No. 10-2007-0061696, issued Jul. 28, 2009, 8 pages.
Korean Intellectual Property Office, "Office Action," with English translation, issued in connection with application serial No. 10-2007-0061696, issued Nov. 27, 2008, 6 pages.
Korean Intellectual Property Office, "Notice of Decision for Patent," with English translation, issued in connection with application serial No. 10-2010-0074374, issued Feb. 16, 2012, 4 pages.
Korean Intellectual Property Office, "Office Action," with English translation, issued in connection with application serial No. 10-2010-0074374, issued Aug. 22, 2011, 8 pages.
United States Patent and Trademark Office, "Notice of Allowance," issued in connection with U.S. Appl. No. 11/426,081, mailed Jan. 14, 2010, 17 pages.
United States Patent and Trademark Office, "Notice of Allowance," issued in connection with U.S. Appl. No. 11/426,081, mailed Jul. 23, 2009, 16 pages.
United States Patent and Trademark Office, "Non-Final Office Action," issued in connection with U.S. Appl. No. 11/426,081, mailed Dec. 11, 2008, 17 pages.
Intellectual Property Office of P.R. China, "Certificate of Invention Patent," issued in connection with Chinese patent No. 7L200710112254.2, issued May 16, 2012, 14 pages.
European Patent Office, "Examination Report," issued in connection with European application serial No. 10 179 031.9. issued Jan. 17, 2013, 3 pages.
European Patent Office, "Communication Under Rule 73(3) EPC", issued in connection with EP patent application No. 10179031.9, mailed Mar. 22, 2013 (6 pages).
Japanese Patent Office, "Certificate of Patent", issued in connection with JP patent application No. 2010191567, granted Mar. 22, 2013 (1 page).
Japanese Patent Office, "Final Office Action," with English translation issued in connection with Japanese application serial No. 20100191567, issued Oct. 11, 2012, 5 pages.
3GPP TS 31.103, "Technical Specification Group Core Network and Terminals; Characteristics of the IP Multimedia Services Identity Module (ISIM) Application," V7.0.0, Jun. 2006, 31 pages. (p. 26).
3GPP TS 23.040, Technical Specification Group Core Network and Terminals; Technical Realization of the Short Message Service (SMS), V6.7.0, Mar. 2006, 191 pages. (pp. 55-58).
3GPP TS 23.002, Technical Specification Group Services and System Aspects; Network Architecture, V7.1.0, Mar. 2006, 62 pages. (p. 20).
ETSI TS 102 226, "Smart Cards; Remote APDU Structure for UICC based Applications," V7.7.0, May 2006, 27 pages. (pp. 7, 10-11).
3GPP TS 31.115, "Technical Specification Group Core Network and Terminals; Secured Packet Structure for (Universal) Subscriber Identity Module (U)SIM Toolkit Applications," V7.0.0, Jun. 2005, 18 pages. (p. 5).

(56) References Cited

OTHER PUBLICATIONS

3GPP TSG-CT1, "CR, SMS Over IP Sender/Receiver Roles," Nokia, Meeting #42, Sophia Antipolis, France, May 8-12, 2006, 3 pages
Canadian Intellectual Property Office, "Notice of Allowance," issued in connection with corresponding Canadian Patent Application No. 2,592,357, mailed Nov. 4, 2014 (1 page).
3GPP TS 24.341. v0.1.0 (May 2006), "3rd Generation Partnership Project; Technical Specification Group Core Network and Terminals; Support of SMS and MMS over IP Networks; Stage 3 (Release 7)", pp. 1-14, May 2006. 3GPP Organizational Partners, Valbonne, France.
Jaseemuddin, "An architecture for integrating UMTS and 802.11 WLAN networks," Computers and Communication, 2003, Proceeding of the Eighth IEEE International Symposium on Jun. 30-Jul. 3, 2003, 716-723.
Australian First Examiner's Report in Application No. 2007202860, dated Sep. 1, 2008, 8 pages.
Canadian Office Action in Canadian Application No. 2592357, dated Aug. 6, 2013, 2 pages.
Canadian Notice of Allowance in Canadian Application No. 2592357, dated Nov. 4, 2014, 1 page.

* cited by examiner

APPARATUS, AND ASSOCIATED METHOD, FOR SUPPORTING SMS MESSAGING BY WAY OF AN IP NETWORK

CROSS REFERENCE TO RELATED APPLICATION

This application is a continuation of U.S. patent application Ser. No. 11/426,081, filed Jun. 23, 2006, the content of which is incorporated herein by reference.

The present invention relates generally to a manner by which to communicate an SMS (Short Message Service) message to a service center by way of a communication network. More particularly, the present invention relates to apparatus, and an associated method, by which to form, and to communicate, an SIP (Session Initiation Protocol) request that contains an encapsulated SMS message, addressed in a manner to permit its routing to a service center by way of an access bearer IP (Internet Protocol).

SMS messaging service is provided irrespective of the IP network-type through which the message is transported. The SIP request is routed to an IP-SM-GW (Internet Protocol-Short Message-Gateway) forming an IWU (Interworking Unit) between a generic IP network and on to a short message service center. Or the SIP request is routed directly to the short message service center in the event that an IP-SM-GW is not required.

BACKGROUND OF THE INVENTION

Advancements in communication technologies have provided the basis for the development and deployment of communication systems that provide for many varied communication services to communicate information between communication endpoints. While the advancements affect many areas of communications, one significant area of advancement is in the field of digital communications. The use of digital communication techniques provides for various advantages. And, as a result, communication systems increasingly are deployed, and existing systems are converted, to utilize digital communication techniques.

In telephonic communication systems, both wireline communication systems and mobile communication systems, there has been an ongoing evolution of communications from circuit-switched technologies to packet-switched technologies. And, in particular, the packet-switched technologies typically utilize IP-based (Internet Protocol-based) protocols. For example, voice services that are provided using SIP (Session Initiation Protocol) and VoIP (Voice over Internet Protocol) are increasingly common. Messaging services are also commonly carried out using IP-based protocols. SIP-based messages are, for instance, communicated between peers forming communication endpoints by way of an IP network.

SMS (Short Message Service) is another exemplary messaging service. SMS was first developed for use in conjunction with a GSM (Global System for Mobile communications) communication system, a communication system that utilizes circuit-switched technologies. GPRS (General Packet Radio Service), a packet-switched technology for GSM has more recently been deployed. And, provisions have been made for the support of communication of SMS messages by way of the packet-switched GPRS architecture provided in a GSM/GPRS communication system.

SMS messaging, even when provided as a packet-switched, GPRS-based service, remains fundamentally tied to a GSM/GPRS network. That is to say, the short message service, and the communication of messages pursuant thereto, conventionally requires use of a GSM/GPRS network. And, concomitantly, for communication of an SMS message, availability of, and access to, a GSM/GPRS network is required. SMS messaging, at present, is not based upon an access-independent IP bearer.

With continued evolution of communications to packet-switched-based systems, particularly IP-based systems, much attention has been directed towards interworking between circuit-switched networks and packet-switched networks with the expectation of eventual evolution completely to IP-based networks. Mechanisms are required by which to provide for communication interworking between different types of networks as communication systems and their networks evolve towards all IP-based networks. Amongst the mechanisms that are required is a mechanism by which to provide for SMS messaging over an IP bearer.

It is in light of this background information related to SMS messaging that the significant improvements of the present invention have evolved.

DETAILED DESCRIPTION

The present invention, accordingly, advantageously provides apparatus, and an associated method, by which to communicate an SMS (Short Message Service) message to a service center by way of a communication network.

Through operation of an embodiment of the present invention, a manner is provided by which to address an SIP request that contains an encapsulated SMS message, addressed in a manner to permit its routing to a service center by way of an access bearer IP.

In one aspect of the present invention, SMS message service is provided irrespective of the IP access network through which the message is routed. The SIP request is routed to an IP-SM-GW (Internet Protocol-Short Message-Gateway) forming an IWU (Interworking Unit) between a generic IP network and then onto a short message service center. Alternately, the SIP request is routed directly to the short message service center in the event that the network need not include an interworking unit, such as the IP-SM-GW.

In another aspect of the present invention, a storage element is provided to an originating communication device, such as a mobile station, at which an address that identifies the IP-SM-GW is stored. The storage element is accessed to retrieve the address when the communication device is to send SMS content. The retrieved address, retrieved from the storage element, is used to address an SIP request that is formed and contains, e.g., in encapsulation, SMS content. The address stored at the storage element forms, e.g., the IP address of an IP-SM-GW, or other interworking unit. Or, the address identifies a short message service center, if the short message service center is identifiable by an IP address, and the SIP request is capable of being routed directly thereto. When delivered to the interworking unit, the interworking unit operates to forward on contents of the SIP request to the short message service center.

In another aspect of the present invention, the storage element is embodied at an SIM (Subscriber Identity Module) card or at a UICC (Universal Integrated Circuit Card). The address stored at the SIM card or UICC is stored thereat, e.g., during initial provisioning of the mobile station forming the communication device or subsequently to initial provisioning, such as during mobile-station registration or otherwise during operation of the mobile station.

In another aspect of the present invention, a provisioning mechanism is provided by which to provision the communication device with the identifier of the IM-SM-GW or SMSC. The provisioning mechanism is formed, for instance, of a detector operable pursuant to OMA (Open Mobile Alliance) device management protocols to detect OMA-formatted signals broadcast, or otherwise sent, thereto that identify the address of the IM-SM-GW. An entry in a managed object, e.g., is made available at the mobile station forming the communication device to contain the address sent thereto. Alternately, the managed object that is used to contain the address is an IMS MO or a connectivity managed object for SMS. Alternately, the provisioning mechanism utilizes CDMA (Code Division Multiple Access) OTA (Over The Air) provisioning and is configured to be capable of detecting a CDMA OTA provisioning signal sent thereto. Or, alternately, the SMS signaling, communicated by way of a circuit-switched bearer is used to provide the appropriate address. Proprietary provisioning mechanisms are, alternately, available for use. And, if a wired connection is available, such as when a mobile station is connected to a docking port and connected to a wired data network, the address is able to be provided to the mobile station by way of the wired connection.

In another aspect of the present invention, the SIP request that is addressed with the address of the IP-SM-GW or SMSC and that contains the encapsulated SMS content forms an SIP message method, or other protocol primitive of the SIP protocol. The SIP message method is permitting of MIME-type content to be exchanged between SIP-capable devices.

In another aspect of the present invention, the address that identifies the IP-SM-GW or SMSC forms a SIP URI, a TEL URI, or a TEL URL. The value of the URI or URL is resolvable to an IP address of a gateway used to interwork SIP/IP with SMS signaling to an SMSC or directly of the SMSC.

Thereby, an SMS message is transportable by way of a generic, IP network, deliverable to an SMSC to provide SMS messaging functionality to a communication device at which the message is originated as well as to a destination station forming a communication endpoint at which the SMS message is to be delivered.

In these and other aspects, therefore, apparatus, and an associated method, is provided for a short-message-service-capable communication device. Communication of a message by way of a network having network entities including at least a short message service center is facilitated. A storage element is configured to store an identifier that identifies a selected network entity of the network entities. A session initiation protocol request generator is adapted to receive the identifier stored at the storage element. The session initiation protocol request generator is configured to generate an SIP request that is addressed with the identifier, and the request has a short message service content encapsulated therein. The request, once addressed, is permitting of routing thereof to the short message service center.

Figure 1:
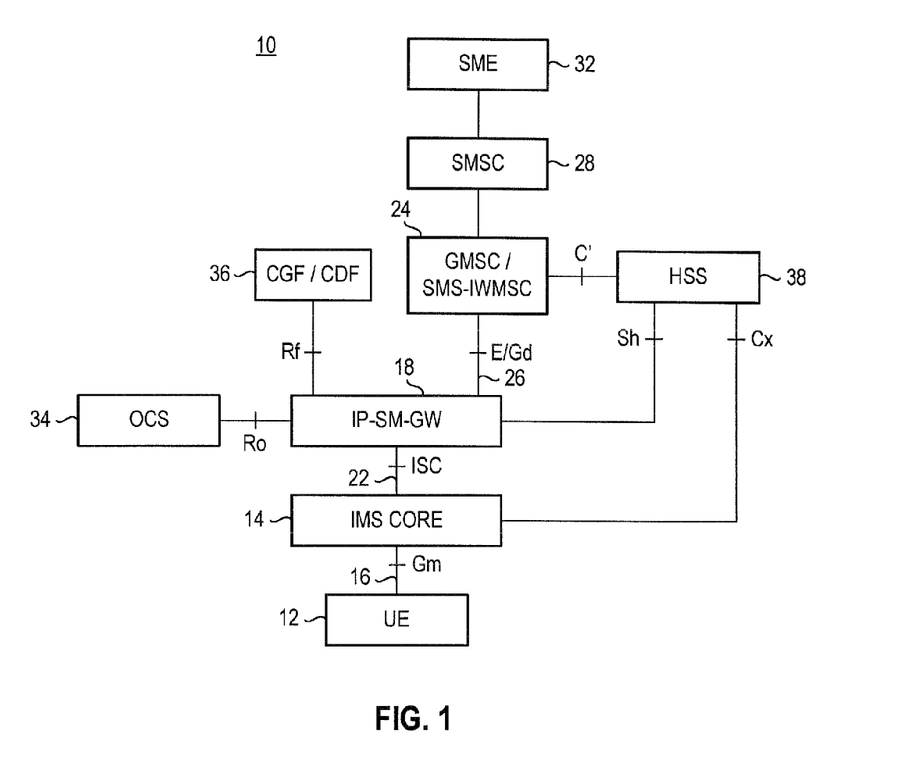
FIG. 1 illustrates a functional block diagram of the architecture of an exemplary network in which an embodiment of the present invention is operable.

Referring, therefore, to FIG. 1, the architecture of a communication system, shown generally at 10, that provides SMS (Short Message Service) signaling over SIP/IP (Session Initiation Protocol/Internet Protocol) is shown. User equipment (UE) 12 is representative of a mobile station, or other communication device, that is SMS-capable. While the following description shall describe exemplary operation of the communication system in which SMS content is originated at the UE formed of a mobile station, such description is merely exemplary. The user equipment is also representative of any of various other types of communication devices.

The user equipment is connected to an IMS core 14 by way of a Gm interface 16. And, the IMS core, in turn, is coupled to an IP-SM-GW 18 by way of an ISC interface 22. The IP-SM-GW 18 forms an interworking unit (IWU) that provides interworking functions between an IP network core, here the IMS core 14, and a GSM/GPRS network.

Here, the IP-SM-GW 18 is coupled to a GMSC/SMS/IWMSC (Gateway Mobile Switching Center/Short Message Service/Interworking Mobile Switching Center) 24 by way of an E/Gd interface 26. And, the entity 24 is connected to a SMSC 28, in conventional manner, in turn, connectable to a short message entity (SME) 32 forming a communication endpoint to which an SMS message is deliverable.

The architecture of the communication system is further shown to include an OCS 34, coupled to the gateway 18 by way of an Ro interface, a CGF/CDF 36 coupled to the gateway 18 by way of a Rf gateway, and an HSS 38, coupled to the entities 14, 18, and 24 by way of the interfaces Cx, Sh, and C', respectively.

The architecture shown in the figure is representative of the architecture specified by the 3GPP (Third Generation Partnership Project) in technical specification, TS 23.204. The architecture is representative of architecture provided for SMS over IP.

The entity forming the IP-SM-GW 18 performs various functions including functions related to protocol interworking for delivery of a short message between the user equipment 12, an IP-based entity, and the short message service center (SMSC) 28. Such functions include, for instance, connection to the GMSC 24 using established MAP (Mobile Application Part) protocols over SS7 (Signaling System 7). The gateway 18 is caused thereby to appear to the GMSC 24 as a mobile switching center or a serving gateway service node (SGSN) using the E or Gd interface. Additional functionality provided by the gateway 18 provides connection to the SMS-IWMSC using established MAP protocols over SS7 to cause the gateway to appear to the SMS-IWMSC as a mobile switching center or a serving gateway service node using the E or Gd interface. The gateway further functions to communicate with the user equipment using IMS messaging as transport while maintaining the format and functionality of the SMS message. Additionally, the gateway functions to acquire knowledge of association between MSISDN (Mobile Station International Subscriber Directory Number) and IP (Internet Protocol) addresses of the user equipment. And, the gateway functions to act as an application server towards the IMS (IP Multimedia Subsystem) core.

Figure 2:
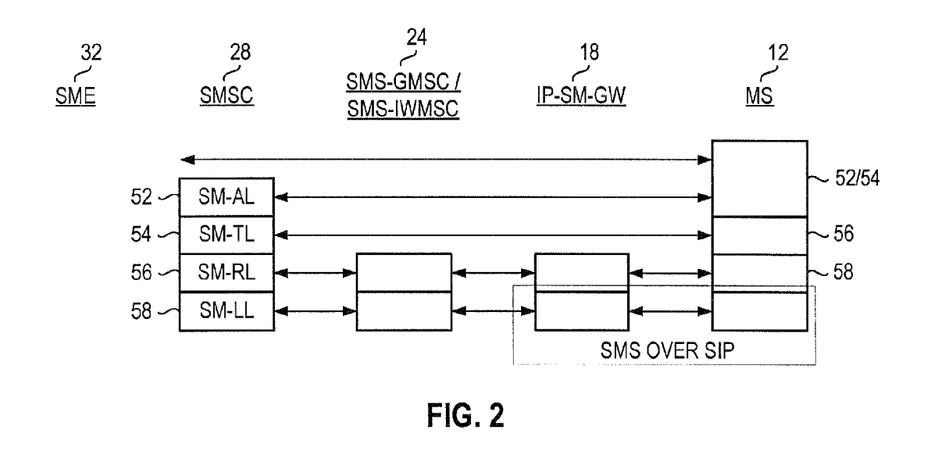
FIG. 2 illustrates a representation of the protocol layers defined, and used, pursuant to SMS messaging in the network whose architecture is represented in FIG. 1.

FIG. 2 illustrates various of the entities of the communication system 10 shown in FIG. 1. Namely, the communication endpoints 12 and 32 in which the user equipment 12 is here represented by a mobile station are shown along with intermediate nodes formed of the IP-SM-GW 18, the SMS-GMSC/SMS-IWMSC 24, and the SMSC 28. A short message application layer (SM-AL) 52, a short message transfer layer (SM-TL) 54, a short message relay layer (SM-RL) 56, and a short message lower layer (SM-LL) 58 comprise the layers of various of the entities.

Layers extending between the mobile station forming the user equipment 12 and the service center 28 are shown. Certain circuit-switched portions of a conventional circuit-switched communication system are substituted with an SIP/IP core network, here the IMS core 14 and the IP-SM-GW 18. An encapsulated SMS message, at the relay, transfer, and application layers is sent by the user equipment to the gateway 18. And, the gateway 18 acts as an interworking point using normal protocols used to deliver SMS messages between the short message service center 28 and the gateway MSC or the SGSN. If the communication system is implemented as an all IP network, the IP-SM-GW is replaced with an SIP/IP core network permitting SIP protocol to be used directly between the user equipment and the SME 32 and the SMSC 28, acting as peer devices.

A protocol primitive of the SIP protocol, the SIP message method, provides for communication, and exchange, of MIME-type content using conventional, SIP protocols. When used in an SIP network, SIP message method messages are communicated in a point-to-point manner between end users by way of a SIP/IP core network. And, messages are addressed to a user identity of the end user wherein the messages are formed of a SIP URI or of a TEL URI. As, however, short message service messaging is a store-and-forward type of scheme, mere use of SIP message method protocol primitives for the communication of SMS messages between end communication points cannot be used; rather, messages must be routed to a short message service center that permits the messages to be stored for subsequent retrieval and delivery.

Pursuant to operation of an embodiment of the present invention, a manner is provided by which to provide for SMS messaging functionality while permitting transport of the messages by way of a generic, IP network, such as that represented by the IMS core 14.

FIG. 3 again illustrates the communication system 10, again shown to include user equipment 12, an IMS core 14, an IP-SM-GW 18, and a network part that includes a short message service center 28 positionable in communication connectivity with a short message entity 32. The short message entity 32 forms any type of communication device, or portion thereof, such as a mobile station or a wired communication device.

Figure 3:
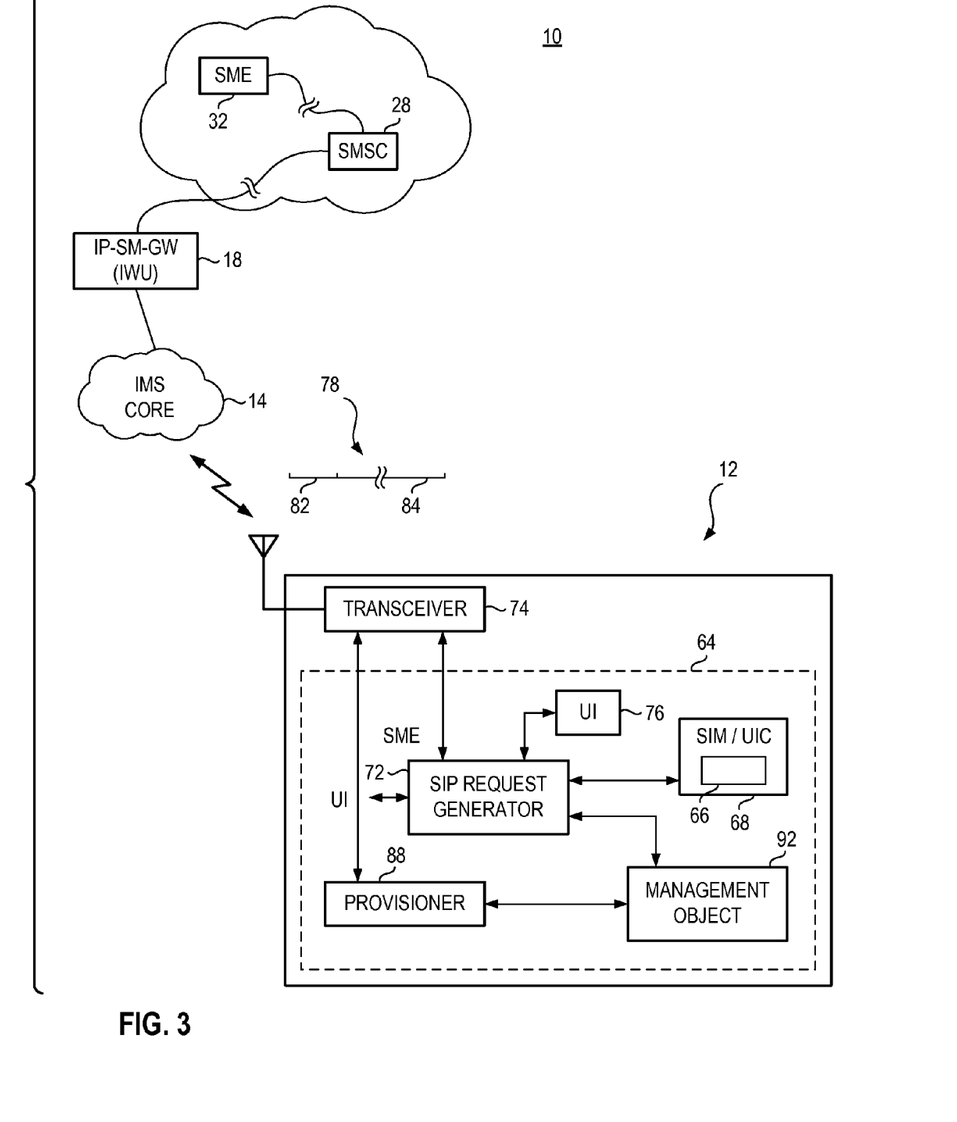
FIG. 3 illustrates a functional block diagram of a communication system that provides for SMS messaging pursuant to an embodiment of the present invention.

The user equipment 12, a mobile station, includes SME (Short Message Entity) functionality 64 and here includes a storage element 66 disposed upon a SIM card or UICC 68. Electrical contacts of a card holder (not separately shown) electrically connect the storage element 66 with a SIP request generator 72.

The user equipment, here forming a mobile station, also includes transceiver circuitry 74 to which the SME is functionally connected. The transceiver circuitry, in conventional manner, includes a transmit part and a receive part for transmitting signals generated during operation of the communication system, including uplink communication of an SIP request generated by the generator 72 and communicated by a transmit part of the transceiver circuitry.

And, the user equipment also includes a user interface 76 that includes an input actuator by way of which a user inputs data that is to form SMS content of an SMS message. The SIP request generated by the generator 72 and caused to be transmitted by the transmit part of the transceiver circuitry 74 is shown at 78. The request includes an address 82 of values corresponding to values stored at the storage element 66 and retrieved therefrom. And, the request also includes SMS content 84 encapsulated in the request.

FIG. 3 further includes entities used pursuant to an alternate embodiment of the present invention, an embodiment in which the address that identifies the IP-SM-GW is provisioned to the user equipment, e.g., by way of a radio air interface, or by way of a tethered or other wired connection with the user equipment. Here, a provisioner 88 operates to detect delivery to the user equipment of the provisioning information. Upon detection by the provisioner, the received address is stored as a management object, represented at 92. When a user of the user equipment elects to send an SMS message, the content of the SMS message is input by way of the user interface or otherwise provided by conventional manner. And, the SIP request generator retrieves the provisioned address and addresses the SIP request with the retrieved address.

Figure 4:
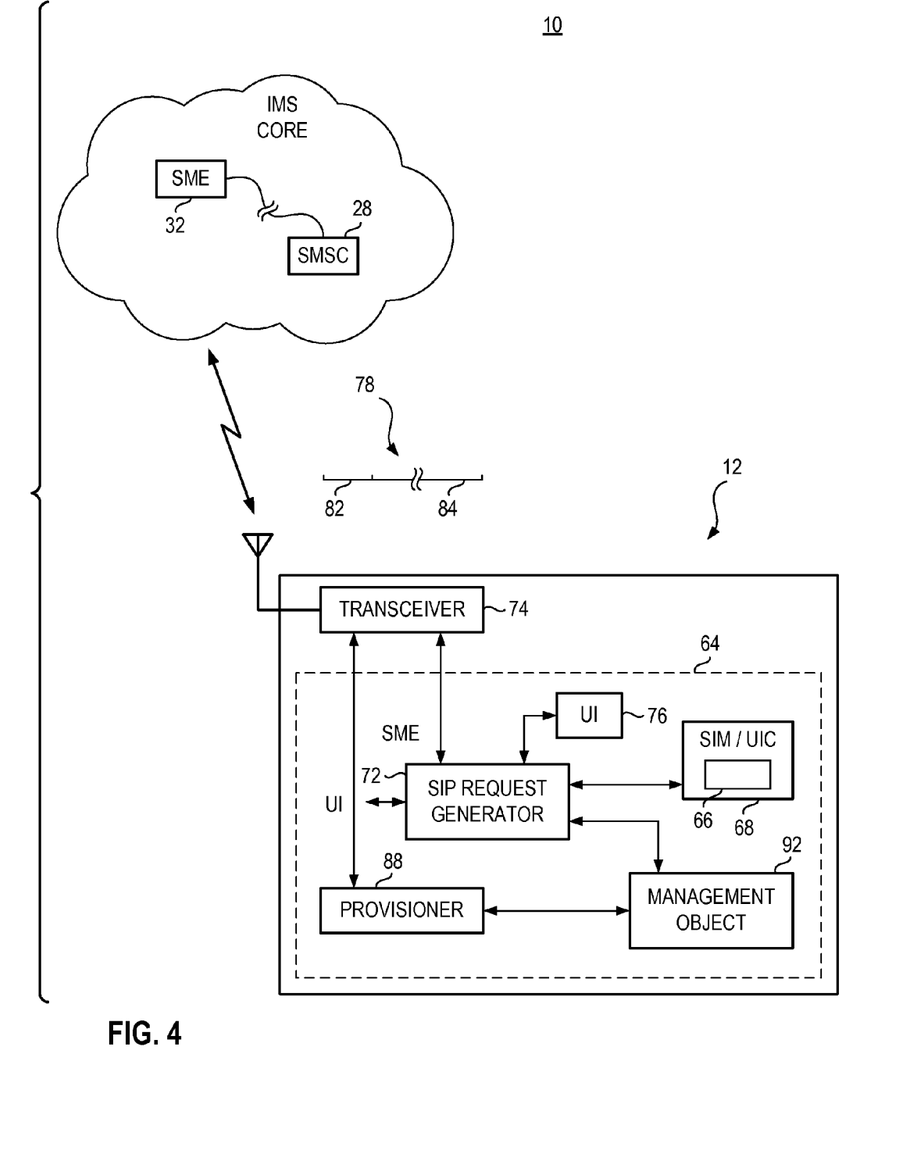
FIG. 4 illustrates a functional block diagram, similar to that shown in FIG. 3, but of an all-IP network.

FIG. 4 again illustrates the communication system 10, here in which the network forms an all IP network, obviating the need for a separate IP-SM-GW. The user equipment 12 is identical to that shown with respect to the implementation shown in FIG. 3. In this arrangement, instead, the address stored at the storage element 66, or at the object 92, comprises an address of the SMSC 28.

During operation, the request generator addresses a SIP message method that contains an encapsulated SMS message with a SIP URI or TEL URI public service identity that represents the IM-SM-GW 18 in the arrangement shown in FIG. 3. If implemented in the arrangement shown in FIG. 4, the SIP URI or TEL URI public service identity that is retrieved and used is of the SMSC 28.

The appropriate address is configured at the user equipment or provisioned thereto. In one implementation, the smart card, ISIM or UICC, is stored on an elementary file (EF), or other storage location of a storage element, capable of reference by the user equipment. In an alternate implementation, OMA (Open Mobile Alliance) device management protocols are used to inform the user equipment of the address of the IM-SM-GW. The provisioner 88 is utilized in this implementation, and an entry in a managed object, here the object 92, is available at the user equipment to contain the address of the IM-SM-GW. The provisioning mechanism, in one implementation is by way of download of a configuration file using client provisioning, such as a SIP CONFIG framework. And, the management object comprises, variously, an SMS management object, a WLAN management object, or an IMS management object. That is to say, an appropriate managed object contains the address of the IM-SM-GW and, in various implementations, forms an IMS MO, a connectivity managed object for SMS, or other object. The provisioning mechanism by which the address is provisioned to the user equipment alternately forms, for instance, CDMA over the air provisioning, use of SMS via circuit-switched bearers, as well as proprietary methods of wireless provisioning or provisioning of the address by way of a wired, e.g., tethered, connection to a data network. For instance, in one implementation, a BlackBerry™ desktop manager provides the provisioning mechanism to a correspondingly configured user equipment device.

Figure 5:
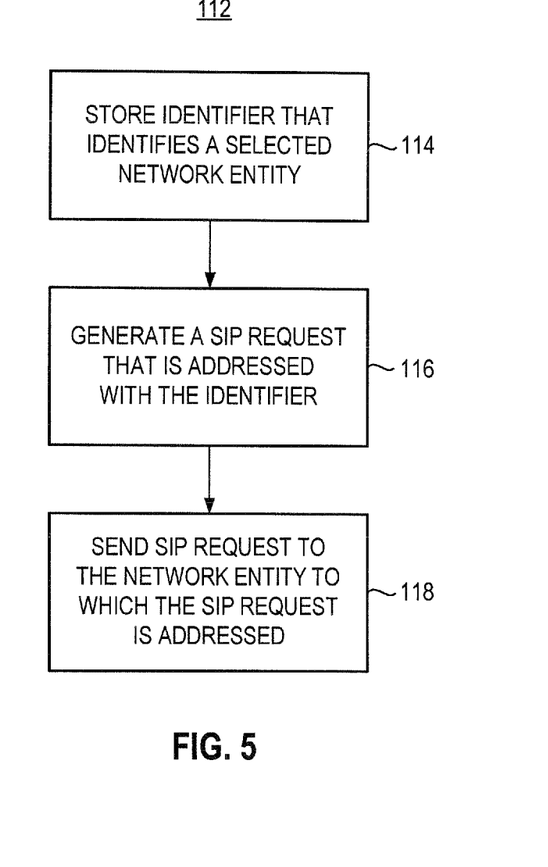
FIG. 5 illustrates a method flow diagram listing the method of operation of an embodiment of the present invention.

FIG. 5 illustrates a method flow diagram, shown generally at 112, representative of the method of operation of an embodiment of the present invention. The method facilitates communication of a message originated at a short message capable communication device by way of a network having network entities comprising at least a short message service center.

First, and as indicated by the block 114, an identifier is stored that identifies a selected network entity of the network entities. Then, and as indicated by the block 116, a SIP request is generated that is addressed with the identifier. The SIP request includes a short message service content encapsulated therein. The SIP request, once addressed with the identifier, is permitting of routing thereof to the short message service center.

And, once the SIP request is formed, the request, as indicated by the block 118, is sent to the network entity to which the SIP request is addressed.

Thereby, through operation of an embodiment of the present invention, an encapsulated SMS message is routable to a short message service center by way of a generic, IP bearer.

The previous descriptions are of preferred examples for implementing the invention, and the scope of the invention should not necessarily be limited by this description. The scope of the present invention is defined by the following claims.

What is claimed is:

1. Apparatus for facilitating communication of a message by way of a network having network entities comprising at least a short message service center, said apparatus comprising:
    a session initiation protocol request generator to read from a storage element, on at least one of a SIM (Subscriber Identity Module) or a UICC (Universal Integrated Circuit Card) of a mobile device, an identifier that identifies a short message service center and said session initiation protocol request generator configured to generate a SIP (Session Initiation Protocol) Request addressed with the identifier and the SIP Request having a short message service content encapsulated therein wherein the identifier comprises one of:
    a session initiation protocol uniform resource identifier, SIP URI, or
    a telephone uniform resource identifier, TEL URI;
    and the apparatus being arranged to send the SIP Request.

2. The apparatus of claim 1 further comprising a transceiver to communicate an SMS message to the storage element, the SMS message comprising the identifier.

3. The apparatus of claim 1 wherein said identifier is received by way of an OTA (Over The Air) provisioning mechanism.

4. A method in a short message capable communication device for facilitating communication of a message originated at the communication device, said method comprising:
    reading from a storage element, on at least one of a SIM (Subscriber Identity Module) or a UICC (Universal Integrated Circuit Card) of a mobile device, an identifier, the identifier identifying a short message service center;
    generating a SIP (Session Initiation Protocol) Request addressed with the identifier, the SIP Request having a short message service content encapsulated therein; and
    sending the SIP Request;
    wherein the identifier comprises one of:
    a session initiation protocol uniform resource identifier, SIP URI, or
    a telephone uniform resource identifier, TEL URI.

5. The method of claim 4 further comprising communicating an SMS message to the storage element, the SMS message comprising the identifier.

6. The method of claim 4 wherein said identifier is received by way of an OTA (Over The Air) provisioning mechanism.

* * * * *